US010328468B2

(12) United States Patent
Tsutsumi

(10) Patent No.: US 10,328,468 B2
(45) Date of Patent: Jun. 25, 2019

(54) METHOD OF MANAGING REUSE OF RETURNABLE BOTTLE

(71) Applicant: NIHON TAISANBIN KOGYOU KABUSHIKI KAISHA, Ogaki-shi, Gifu-ken (JP)

(72) Inventor: Takeshi Tsutsumi, Ogaki (JP)

(73) Assignee: NIHON TAISANBIN KOGYOU KABUSHIKI KAISHA, Gifu-ken (JP)

(*) Notice: Subject to any disclaimer, the term of this patent is extended or adjusted under 35 U.S.C. 154(b) by 0 days.

(21) Appl. No.: 15/814,294

(22) Filed: Nov. 15, 2017

(65) Prior Publication Data
US 2018/0345326 A1 Dec. 6, 2018

(30) Foreign Application Priority Data

Jun. 6, 2017 (JP) .................................. 2017-111598

(51) Int. Cl.
*G06K 19/06* (2006.01)
*B08B 3/04* (2006.01)
(Continued)

(52) U.S. Cl.
CPC ............ *B08B 3/047* (2013.01); *B05C 13/025* (2013.01); *B07C 5/3412* (2013.01); *G06K 1/126* (2013.01);
(Continued)

(58) Field of Classification Search
CPC ... B08B 3/047; G06K 19/06037; G06Q 10/30
(Continued)

(56) References Cited

U.S. PATENT DOCUMENTS

2014/0237951 A1* 8/2014 Szydlowski ............ A23L 2/00
  53/473
2015/0166391 A1* 6/2015 Marjanovic ......... C03B 33/0222
  428/43
2016/0340082 A1* 11/2016 Bryant ................. B65D 23/00

FOREIGN PATENT DOCUMENTS

FR   2 927 839 A1   8/2009
JP   2003-517972 A   6/2003
(Continued)

OTHER PUBLICATIONS

Notice of Allowance for the Application No. 2017-111598 from Japan Patent Office dated Nov. 6, 2018.
(Continued)

*Primary Examiner* — Toan C Ly
(74) *Attorney, Agent, or Firm* — Cheng Law Group, PLLC

(57) ABSTRACT

A method of managing reuse of a returnable bottle is disclosed. The method individually manages returnable bottles so as to manage reuse linked with their individual states of use and thereby enable reusable bottles to be separated from other bottles in a scientific manner. The method comprises, at the time of new production of a returnable bottle body, forming on a bottle body surface a product identification mark part engraved with an identification code as product identification data of the bottle body, reading the product identification mark part and writing and storing the product identification data of the bottle body in the storage medium linked with individual transport state data relating to transport of the bottle body, and judging permission for continued reuse of the bottle body based on the individual transport state data stored in the storage medium.

7 Claims, 2 Drawing Sheets

(51) Int. Cl.
  *B05C 13/02* (2006.01)
  *B07C 5/34* (2006.01)
  *G06Q 10/08* (2012.01)
  *G06K 1/12* (2006.01)
  *G07F 7/06* (2006.01)
  *B65D 23/08* (2006.01)

(52) U.S. Cl.
  CPC ..... *G06K 19/06103* (2013.01); *G06Q 10/087* (2013.01); *G07F 7/0609* (2013.01); *B65D 23/0814* (2013.01)

(58) Field of Classification Search
  USPC .................................. 235/376, 382, 462.09
  See application file for complete search history.

(56) References Cited

FOREIGN PATENT DOCUMENTS

| JP | 5552147 B2 | 7/2014 |
|---|---|---|
| WO | WO-2004/000749 A1 | 12/2003 |
| WO | WO-2016/204619 A2 | 12/2016 |

OTHER PUBLICATIONS

Notification of Reasons for Refusal for the Application No. 2017-111598 from Japan Patent Office dated Jul. 17, 2018.
Extended European Search Report for the Application No. 17 200 758.5 dated Mar. 8, 2018.

\* cited by examiner

METHOD OF MANAGING REUSE OF RETURNABLE BOTTLE

BACKGROUND OF THE INVENTION

1. Field of the Invention

The present invention relates to a method of managing reuse of a returnable bottle.

2. Description of the Related Art

Known in the field of bottles for packaging beverages are returnable bottles such as beer bottles and milk bottles which are collected after being used and emptied and then washed and refilled for repeat use. Such returnable bottles are being looked at again as being more environmentally friendly containers, compared with one-way bottles which are disposed of after single use, from the viewpoints of reducing production of waste, conserving raw materials and the resources and energy involved in production, and reducing $CO_2$ emissions and other environmental load. In recent years, proposals have been made for raising the strength of the bottle bodies to make them more resistant to cracking and scratching and coating the surfaces of the bottle bodies with plastic to protect the bottle bodies and improve the efficiency of reuse (see Japanese Patent No. 5552147).

When considering the relative superiority of returnable bottles in the above sense, the number of times of reuse, that is, how many times a bottle can be reused, is an important issue. In general, in Japan, a returnable bottle which cannot be reused three times is considered inferior in environmental load compared with a single use light weight one-way bottle (analysis of environmental load of small beer bottles in 2008 Environmental Agency Glass Bottle Recycling Promoter Association "Current State of Returnable Bottles in Japan"). Further, in Japan, a returnable bottle is considered, to be usually reused for about eight years over 20 times (Japan Glass Bottle Association HP "Returnable Bottles"). A returnable bottle which is reused 20 times is considered to be improved from "large environmental impact (rank 5) to "small environmental impact" (rank 1 or 2) compared with one-way bottles in respect to the categories of evaluation of global warming $CO_2$, air pollution, energy consumption, and solid waste ("Relative Comparison of Containers by Inventory Analysis", Glass Bottle Recycling Promoter Association, "Returnable Bottle Navi").

In this way, in returnable bottles, the number of times of reuse is an extremely important element in terms of the above-mentioned environmental load of course and also the operations of bottle manufacturers and beverage manufacturers. On the other hand, however, at the present time, the number of times of use cannot be precisely determined. Further, whether or not reuse is permitted should take into consideration the durability of the bottle as well, but in the past there was a strong tendency to rely on the state of appearance through visual inspection etc. It was not easy to judge the actual durability. Further, in conventional inspection of bottle bodies, the standard for inspection of internal deterioration etc., which cannot be determined from outside appearance, has not been clearly laid out.

Therefore, the inventor came up with the idea of individually managing returnable bottles so as to manage reuse linked with the individual states of use. Due to this, accurate, scientific management of reuse becomes possible and internal deterioration etc. not able to foe determined from the outside appearance can also foe efficiently inspected.

As related art, see the above Japanese Patent No. 5552147.

SUMMARY OF TEE INVENTION

The present invention, based on the above idea, provides a novel method of managing reuse of a returnable bottle which individually manages returnable bottles so as to manage reuse linked with their individual states of use, in particular individual usage data relating to the transport of the bottles, and thereby enable reusable bottles to be accurately, easily, and efficiently be separated from other bottles in a scientific manner and enable efficient inspection of internal deterioration etc. which cannot be determined from outside appearance. Further, the present invention provides a method of managing reuse of a returnable bottle efficiently promoting reuse of returnable bottles and thereby lowering the costs relating to reuse and reducing energy and otherwise benefitting the environment.

That is, the aspect of the invention of claim 1 relates to a method of managing reuse of a returnable bottle comprising, at the time of new production of a returnable bottle body, forming on a bottle body surface a product identification mark part engraved with an identification code as product identification data of the bottle body, reading the product identification mark part and writing and storing the product identification data of the bottle body in the storage medium linked with individual transport state data, and judging permission for continued reuse of the bottle body based on the individual transport state data stored in the storage medium.

The aspect of the invention of claim 2 relates to a method of managing reuse of a returnable bottle according to claim 1, wherein the individual transport state data is travel distance data relating to the travel distance and the permission for continued reuse is judged by the travel-distance data of the bottle body indicating a predetermined distance.

The aspect of the invention of claim 3 relates to a method of managing reuse of a returnable bottle according to claim 1, wherein the travel distance data is found from a filling location (A) of the bottle body and a point of sales (B) after filling the bottle body.

The aspect of the invention of claim 4 relates to a method of managing reuse of a returnable bottle according to claim 1 wherein the travel distance data is found from a filling location (A) of the bottle body, a point of sales (B) after filling the bottle body, and a collection point (C) after use of the bottle body.

The aspect of the invention of claim 5 relates to a method of managing reuse of a returnable bottle according to claim 1, wherein the product identification mark part is formed on the bottle body surface by laser engraving at the time of the hot end of the process for producing the bottle body.

The aspect of the invention of claim 6 relates to a method of managing reuse of a returnable bottle according to claim 1, wherein the product identification mark part is formed with a two-dimensional code.

According to the method of managing reuse of a returnable bottle according to the aspect of the invention of claim 1, at the time of new production of a returnable bottle body, the bottle body surface is formed with a product identification mark part engraved with an identification code as product identification data of the bottle body, the product identification mark part is read and the product identification data of the bottle body is written and stored in the storage medium linked with individual transport state data relating to transport of the bottle body, permission for continued reuse of the bottle body is judged based on the individual transport state data stored in the storage medium by managing individually in what state of transport a collected bottle was used after being manufactured, so it is possible to accurately, easily, and efficiently separate reusable bottles from other bottles in a scientific manner and efficiently inspect for internal deterioration etc. which cannot foe determined from outside appearance. Further, it efficiently promotes reuse of returnable bottles and thereby lowers the costs relating to reuse and reduces energy and otherwise benefits the environment.

According to the method of managing reuse of a returnable bottle according to the aspect of the invention of claim 2, there is provided the aspect of the invention of claim 1 wherein the individual transport state data is travel distance data relating to the travel distance and permission for continued reuse is judged by the travel distance data indicating a predetermined distance, so it is possible to accurately, easily, and efficiently separate bottles able to be reused from other bottles in a scientific manner by the numerical value of the travel distance.

According to the method of managing reuse of a returnable bottle according to the aspect of the invention of claim 3, there is provided the aspect of the invention of claim 1, wherein the travel distance data is found from the filling location (A) of the bottle body and the point of sale (B) of the bottle body after being filled, so in many cases, the travel distance of a bottle body is judged by the distance between a predetermined filling location (A) and point of sale (B), so by entering these, it is possible to immediately and efficiently find a large number of distance data with changes.

According to the method of managing reuse of a returnable bottle according to the aspect of the invention of claim 4, there is provided the aspect of the invention of claim 1, wherein the travel distance data is designed to be found from the filling location (A) of the bottle body, the point of sale (B) of the bottle body after being filled, and a collection point (C) after the bottle body is used, so in some cases the judgment is rendered using the distance from the collection point (C) after the bottle body is used in addition to the predetermined filling location (A) and point of sales (B) as the travel distance of the bottle foody, so by entering these, it is possible to immediately and efficiently find more accurate distance data.

According to the method of managing reuse of a returnable bottle according to the aspect of the invention of claim 5, there is provided the aspect of the invention of claim 1, wherein the product identification mark part is formed on the bottle body surface by laser engraving at the time of the hot end of the process for manufacturing the bottle body, so the product identification mark part of the bottle body surface becomes resistant to fine scratches etc.

According to the method of managing reuse of a returnable bottle according to the aspect of the invention of claim 6, there is provided the aspect of the invention of claim 1, wherein the product identification mark part is formed with a two-dimensional code, so it is possible to reduce the size of the product identification mark part of the bottle body surface and the aesthetic appearance is also excellent.

DESCRIPTION OF PREFERRED EMBODIMENTS

Bottles are recycled by collecting the bottles from stores and local collection points, washing them at bottle dealers and bottle washing plants etc., refilling them at bottling plants, and shipping them out to stores in a continuously circulating system. In recent years, the entire process from washing to refilling has increasingly been handled all together by bottling plants (manufacturers). The management method of the present invention is a management method enabling easy separation of reusable bottles from other bottles in the processes from the washing process to the refilling process.

Figure 1:
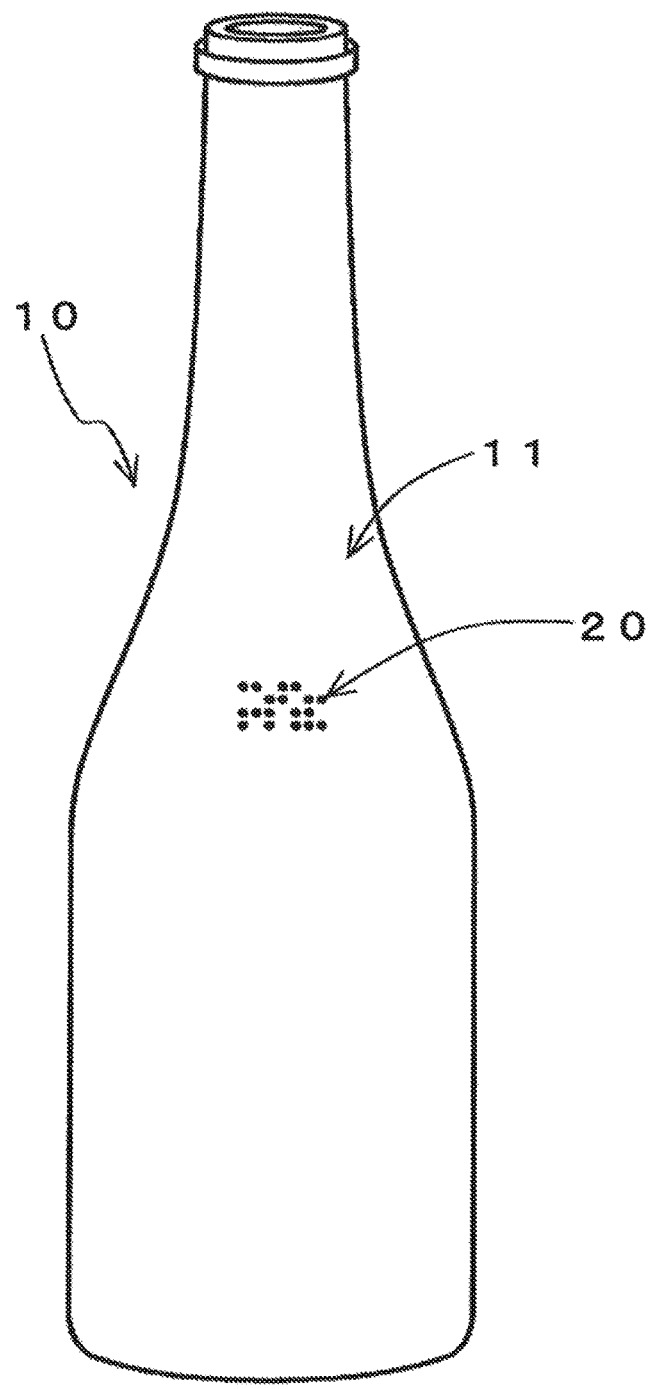
FIG. 1 is a front view of a bottle body in which a product identification mark part is formed and FIG. 2 is a flow chart showing an outline of the present invention.

The method of managing reuse of a returnable bottle according to the present invention is a method of managing a returnable bottle which is collected after use, washed, then refilled for reuse. As shown in FIG. 1, the surface 11 of the bottle body 10 of a returnable bottle is formed with a product identification mark part 20. The product identification mark part 20 should be formed at a position such as the shoulder which is resistant to scratching so as to prevent rubbing etc. from making identification difficult. This product identification mark part 20, as described in claim is formed by laser engraving at the time of the hot end of the process for manufacturing the bottle body. Since this is done at the time of the hot end of the process, it is possible to protect the mark, part from fine cracks and other trouble and the strength of the bottle body 10 is not damaged. Further, since the bottle body is high in temperature, formation by laser engraving is excellent in precision and thereby preferred.

Further, the product identification mark part 20 is formed at the bottle body engraved with a product identification code enabling identification of individual products. The product identification code may, for example, be one encoding the manufacturing date (year, month, day, hour, minute, and second) or manufacturing line etc. It is sufficient that it be data enabling identification of the individual bottle. Further, the product identification mark part, as described in claim 6, may be formed with a two-dimensional code. A two-dimensional code enables a greater amount, of information to be encoded compared with a one-dimensional code (bar code), so the engraved area can be reduced in size and therefore the appearance of the bottle body can be kept from being harmed and the aesthetic appeal can be kept excellent.

The storage medium stores individual transport state data linked with the product identification data. Permission for continued reuse of the bottle body is judged based on the individual transport state data. The identification data assigned to the bottle body and individual transport state data are tied together. When reading the product identification mark part of the bottle body, the individual transport state data is called up to judge if the bottle can be reused so as to separate the bottle from others. Further, as described in claim 2, the individual transport state data is travel distance data relating to the travel distance. Permission for continued reuse is judged by the individual transport state data indicating a predetermined distance.

Among the reasons for scratches etc. at the bottle body surface, the most prevalent one is the bottle bodies rubbing against the wall surfaces of their cases during transport or against each other. Due to this, a bottle body which has been transported over a certain distance or more is expected to have a higher possibility of having a certain degree or more of scratches at the point where the bottle body surface becomes the largest in size or the so-called contact points. Accordingly, if the travel distance of a bottle body is larger than a predetermined distance, it can be judged that the bottle body cannot be reused.

Further, when judging the travel distance of a bottle body, as described in claim 3, the travel distance data can be found from the filling location (A) of the bottle body and the point of sales (B) after filling. If the bottle body is transported from the filling location (A) to the point of sales (B) and after use is collected at the filling location, the travel distance of the bottle body can be considered to be about at least the distance (1×D1) of travel back and forth between AB (D1).

Further, depending on the cycle of reuse of the returnable bottle, sometimes the bottle body is not directly collected by the bottling plant (manufacturer) of the filling location (A), but a bottle dealer is interposed as a collection point, so as described in claim 4, the travel distance data can be found from the above filling location (A) and point of sales (B) and the collection point (C) of the bottle body after use. The travel distance of the bottle body can be considered to be about at least the distance (D1+D2+D3) of travel between AB (D1), between BC (D2), and between CA (D3).

Figure 2:
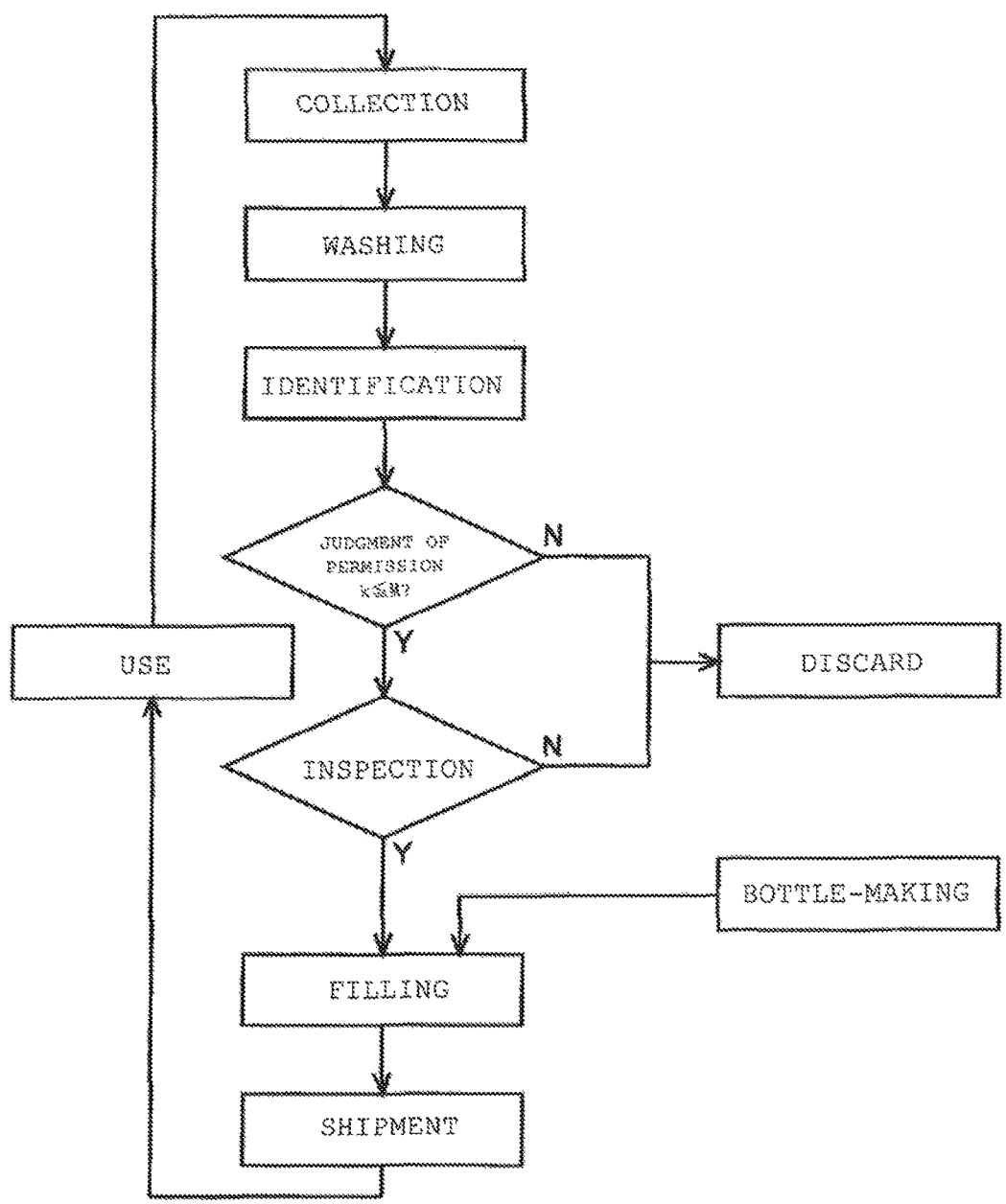

Next, the management method of the present invention will be explained in brief with reference to the flow chart of FIG. 2 and an example. First, a collected bottle is sent to a washing process where the bottle body is washed. Due to the washing, the product identification mark part becomes easier to recognize. Next, at the identification process, the product identification data of the product identification mark part of the bottle body is read. The reading can be performed by infrared rays, optical recognition, image recognition, or other known means.

When handling several types of bottle bodies at one time, the product identification data can be stored in the storage medium linked with shapes, colors, sizes, etc. so as to enable the bottles to be separated into different types without image recognition, weight measurement, or other complicated separation processes.

Further, the recognized product identification data is compared against product identification data in the storage medium to call up the individual transport state data of the bottle body. In the process for judgment of permission of continued use, if the individual state data, that is, travel distance (r), of the called up individual transport state data is a predetermined distance (M) or less (r≤M), the bottle is sent on to the nest inspection process, while if the data is larger than the predetermined distance (r≥M), the bottle body is disposed of. In the inspection process, scratches and cracking of the bottle body etc. are also checked for. In the inspection process, visual inspection, image recognition, optical recognition, etc. is used to finally examine the bottle body for scratches, cracks, fractures, etc.

In the process for judgment of permission for continued use, permission for continued reuse of the bottle body is judged scientifically based on individual transport state data of the bottle body. A certain number of bottle bodies is discarded so as to reduce the number of bottle bodies processed in the final inspection process and thereby make the bottle recycling process more efficient and cut costs. Further, permission for reuse is judged by the number of times of use and other scientific data, so the standard for judging permission for reuse becomes clear and the quality becomes stable.

A bottle body judged able to be reused is filled in the filling process and then shipped out. Usually, the destination (point of sale) is determined for each lot, so for the individual transport state data of the bottle bodies belonging to that lot, the filling location (A) and point of sale (B) are stored in the storage medium. When the collection point of used bottle bodies differs from the filling location (A) (when going through a collection point (C) of a bottle dealer etc.), for the individual transport state data of the bottle body, the collection point (C) is also stored in the storage medium. The timings at which the data are stored in the storage medium are not particularly limited and may be any timings.

Incidentally, at this stage, individual usage state data other than the above transport state data, for example, the time, location, content, number of times of use, and other additional data relating to reuse can be written in and stored. These additional data may be efficiently and advantageously used for management of reuse of returnable bottles together with the transport state data or independently.

In this way, according to the method of managing reuse of a returnable bottle according to the present invention, by assigning each bottle body with product identification data and managing the same, it becomes possible to judge permission for reuse scientifically by a clear standard. It is possible to promote greater efficiency in the recycling process of bottle bodies, so the costs involved in reuse of bottles can be cut and reuse of bottles can be promoted, the energy accompanying bottle manufacture can be saved, and generation of $CO_2$ and garbage can be suppressed. Further, it is possible to collect information on deterioration based on the elapsed time from, manufacture of the bottle body and travel distance, number of times of use, etc. in the stored individual state data, so further development and reuse of returnable bottle can be promoted and the environmental load can be reduced. Further, since the transport distance is known, it is possible to calculate the amount of emission of $CO_2$ relating to transport of the bottle body, so it is possible to obtain a clear grasp of the environmental load accompanying use of the returnable bottle and possible to contribute to reduction of the environmental load.

What I claimed is:

1. A method of managing reuse of a returnable bottle comprising,
    at the time of new production of a returnable bottle body, forming on a bottle body surface a product identification mark part engraved with an identification code as product identification data of said bottle body,
    reading said product identification mark part and writing and storing said product identification data of said bottle body in a storage medium linked with individual transport state data relating to transport of the bottle body, and
    judging permission for continued reuse of said bottle body based on said individual transport state data stored in said storage medium;
    wherein said individual transport state data is travel distance data relating to the travel distance and the permission for continued reuse is judged by the travel distance data of said bottle body indicating a predetermined distance;
    wherein said travel distance data is found from a filling location (A) of said bottle body and a point of sales (B) after filling said bottle body.

2. The method of managing reuse of a returnable bottle according to claim 1, wherein said travel distance data is further found from a collection point (C) after use of said bottle body.

3. The method of managing reuse of a returnable bottle according to claim 1, wherein said product identification mark part is formed on the bottle body surface by laser engraving at the time of the hot end of the process for producing the bottle body.

4. The method of managing reuse of a returnable bottle according to claim 1, wherein said product identification mark part is formed with a two-dimensional code.

5. The method of managing reuse of a returnable bottle according to claim 1,
   wherein the storage medium is further linked with individual usage state data, the individual usage state data comprising a time, location, content, and number of times of use, and
   wherein judging permission for continued reuse of said bottle body is based on both said individual transport state data and said individual usage storage data stored in the storage medium.

6. The method of managing reuse of a returnable bottle according to claim 1, further comprising:
   calculating an emission of $CO_2$ relating to transport of the bottle body to determine a level of environmental load accompanying use of the returnable bottle,
   wherein judging permission for continued reuse of said bottle body is based on both said individual transport state data stored in the storage medium and the calculated $CO_2$ emission.

7. The method of managing reuse of a returnable bottle according to claim 1,
   wherein the product identification data is stored in the storage medium, the storage medium being linked with shapes, colors, and sizes.

* * * * *